(12) United States Patent
Wilson

(10) Patent No.: US 10,117,386 B1
(45) Date of Patent: Nov. 6, 2018

(54) SYNTHETIC TURF REMOVAL SKID STEER ATTACHMENT ASSEMBLY

(71) Applicant: Troy Wilson, Saegertown, PA (US)

(72) Inventor: Troy Wilson, Saegertown, PA (US)

( * ) Notice: Subject to any disclaimer, the term of this patent is extended or adjusted under 35 U.S.C. 154(b) by 0 days.

(21) Appl. No.: 13/923,298

(22) Filed: Jun. 20, 2013

(51) Int. Cl.
*A01G 20/18* (2018.01)
*A01G 20/12* (2018.01)
*E01C 13/08* (2006.01)

(52) U.S. Cl.
CPC .............. *A01G 20/12* (2018.02); *A01G 20/18* (2018.02); *E01C 13/08* (2013.01)

(58) Field of Classification Search
CPC .......... A01G 1/12; A01G 1/004; E01C 13/08; A63C 19/12
USPC ........ 172/19, 20, 15, 811, 817; 83/368, 370, 83/371, 663, 365; 144/357, 3.1, 39, 378, 144/250.23
See application file for complete search history.

(56) References Cited

U.S. PATENT DOCUMENTS

| | | | | |
|---|---|---|---|---|
| 1,179,795 A * | 4/1916 | Beaupre | ................. | A01B 45/04 172/19 |
| 3,201,944 A * | 8/1965 | Christensen | ................... | 405/184 |
| 3,812,918 A * | 5/1974 | Beck | ...................... | A01B 45/04 172/19 |
| 4,049,060 A * | 9/1977 | Hoke | .............................. | 172/19 |
| 4,354,556 A * | 10/1982 | Evans | ..................... | A01B 45/04 172/19 |
| 5,437,528 A * | 8/1995 | Decker | ................. | A01B 45/045 212/246 |
| 6,112,825 A * | 9/2000 | Hutchison | ....................... | 172/19 |
| 6,131,668 A * | 10/2000 | Houska | .................. | A01B 45/04 172/19 |
| 6,135,211 A * | 10/2000 | Schroeder | ....................... | 172/19 |
| 6,299,094 B1 * | 10/2001 | James, Jr. | .......... | A01G 13/0287 242/390 |
| 6,347,670 B1 * | 2/2002 | Miskin | ......................... | 172/199 |
| 6,393,814 B1 * | 5/2002 | Gorey | .............................. | 56/229 |
| 6,769,495 B1 * | 8/2004 | Van Loen | ...................... | 172/19 |
| 2002/0144825 A1 * | 10/2002 | Bass | ..................... | A01B 45/04 172/19 |
| 2002/0179308 A1 * | 12/2002 | deVries | .......................... | 172/19 |
| 2003/0037984 A1 * | 2/2003 | McPherson | ............ | B62D 21/00 180/311 |
| 2003/0089002 A1 * | 5/2003 | Bares et al. | .................... | 37/348 |
| 2003/0136565 A1 * | 7/2003 | Peterson | ................ | A01G 1/004 172/20 |
| 2004/0040725 A1 * | 3/2004 | Stevens | .................. | A01B 31/00 172/815 |
| 2010/0314482 A1 * | 12/2010 | Merkt | ........................... | 242/557 |
| 2010/0319510 A1 * | 12/2010 | Bearden | ......................... | 83/155 |
| 2011/0042111 A1 * | 2/2011 | Pugh | .............................. | 172/19 |
| 2011/0073701 A1 * | 3/2011 | Ford | ....................... | A01G 1/004 242/592 |
| 2013/0186314 A1 * | 7/2013 | Carlson | .................. | A01G 1/004 111/100 |
| 2013/0189057 A1 * | 7/2013 | Motz | ...................... | A01G 1/004 414/345 |

* cited by examiner

*Primary Examiner* — Jessica H Lutz

(57) ABSTRACT

A turf removal attachment is bolted to a skid steer to allow hydraulic motors thereon to first power cutting blades to form easily removable strips of turf and then, on a lower gear ratio, the drum to which roller tines are attached to spool the strips of turf. Hydraulic circuitry is provided to permit the hydraulic fluid of the skid steer to power the turf removal tools on the turf removal attachment.

13 Claims, 4 Drawing Sheets

SYNTHETIC TURF REMOVAL SKID STEER ATTACHMENT ASSEMBLY

Applicant claims the benefit of provisional patent application 61/660,781 filed Jun. 20, 2012 which is hereby incorporated by reference.

BACKGROUND AND SUMMARY OF THE INVENTION

The present invention is directed to an attachment for a skid steer to facilitate removal of artificial turf. While the terminology "skid steer" is used throughout this specification and claims, it will be appreciated that other self-powered vehicles may be used as well and that it is intended that the term "skid steer" include any and all such vehicles.

Warranties on artificial turf typically expire at the $10^{th}$ anniversary of installation. Most stadium owners/operators seek to remove and replace their turf fields as that important anniversary approaches in order to avoid any possible legal liability for injuries resulting from a defective surface.

Before a new surface can be installed, the old has to be taken up. Removal of an existing synthetic turf, whether it is for baseball, football, soccer or other use, is difficult and time consuming. The resultant rolls of turf are extremely heavy and, depending on size, can weigh between 3000 and 6000 pounds. Sloppy rolls are more difficult to handle and take up more space in dumpsters or other disposal bins.

Most turf removal projects are performed manually requiring significant manpower (10-12 personnel) and requiring almost an entire week. Existing automated removal equipment is expensive, and, in some cases is difficult to use, has low power and, accordingly, takes several days to accomplish the removal process. Due to the inefficiency and the excessive expense, most removal teams opt to revert to manual removal methods.

It is the object of the present invention to provide a less expensive mechanical alternative which permits removal to be accomplished in 1-1½ days by a single operator, if need be. Further, with the turf removal attachment of the present invention, a tight roll requiring less space and, accordingly, fewer disposal bins, is achieved.

The present invention comprises a synthetic turf removal attachment adapted to be secured to and powered by a skid steer, the removal attachment including: a) a C-shaped frame having a spine with first and second arms extending laterally from first and second longitudinal end portions of the spine, the first and second spaced arms adapted to support turf removal tools; b) first and second motors for powering the turf removal tools mounted on the first and second spaced arms, respectively; c) at least one attachment to a source of energy, the at least one attachment being mounted on the spine, the source of energy adapted to supply power to the first and second motors.

Preferably the first and second motors comprise hydraulic motors for powering the turf removal tools. The removal attachment includes a supply system for providing hydraulic fluid from a single hydraulic source, the supply system including a splitter valve to divide a fluid stream from the single hydraulic source to ensure equal force is applied to both of the first and second hydraulic motors. Quick couplers are provided to attach the supply system to a remote hydraulic source on the skid steer being used to manipulate the turf removal attachment. In addition, a pair of cutting blades are provided, each one of the pair being attachable to the first and second arms for energization by said first and second motors, respectively, to slice an artificial turf surface into manageable strips. First and second cutter shoes partially surround the first and second cutter blades and first and second blade guards overlie a top portion of the first and second cutter blades, respectively.

The turf removal tools further include a pair of roller tines, one each of the roller tines being attachable to the first and second arms, respectively, and being powered by the first and second motors to roll up the sliced turf strips. The removal attachment includes first and second slidable mounts supporting the first and second arms on the first and second ends of the spine, respectively, and further comprising first and second hydraulic rams to move the first and second arms laterally relative to the first and second longitudinal ends of the spine along the first and second slidable mounts, respectively. Further the removal attachment includes first and second height-adjustable wheels rotatably mounted to the first and second longitudinally extending arms, respectively.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
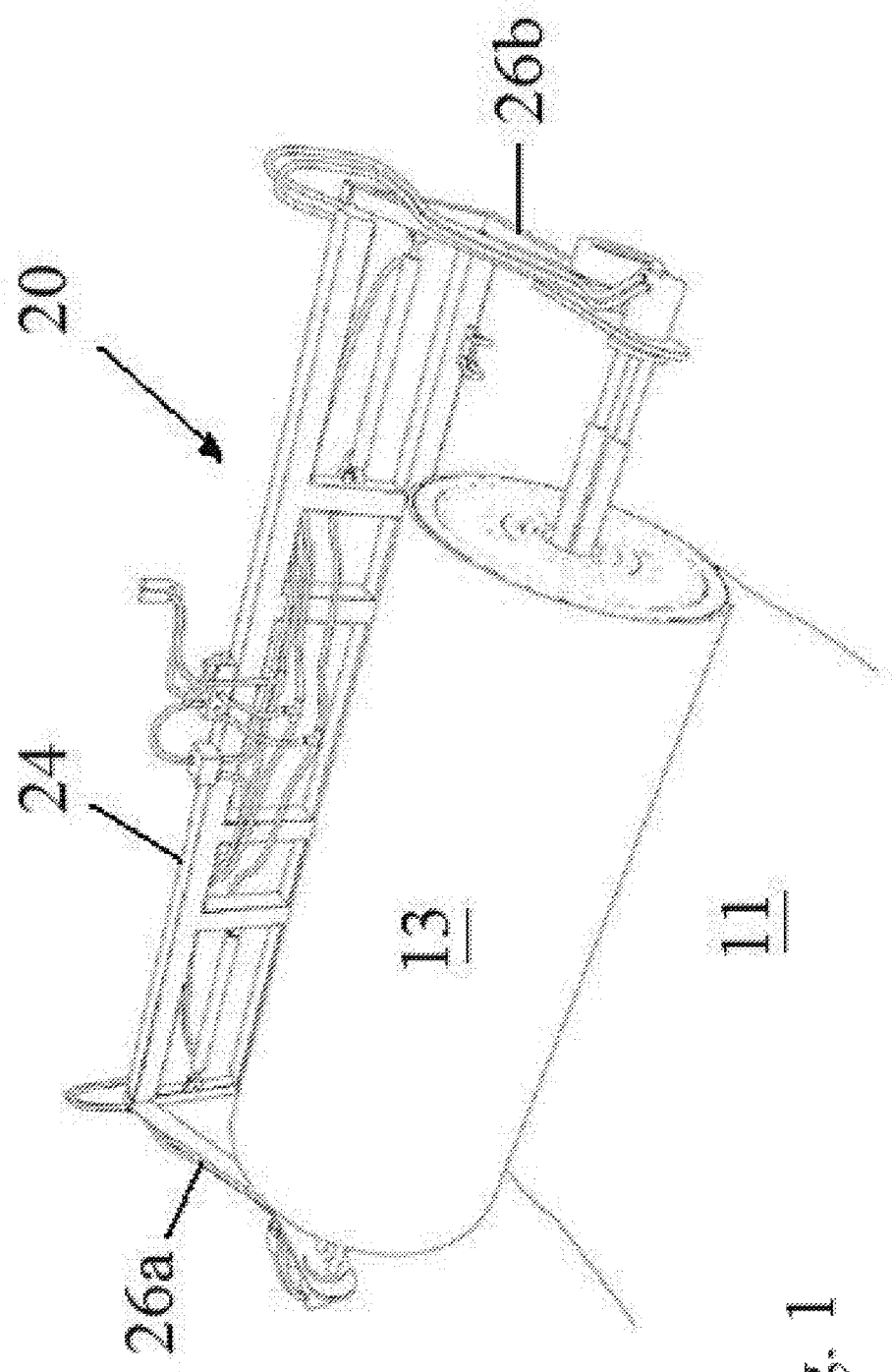
FIG. 1 is a partial perspective front view of a first embodiment of the turf removal attachment of the present invention showing a partial turf roll thereon.
Figure 4:
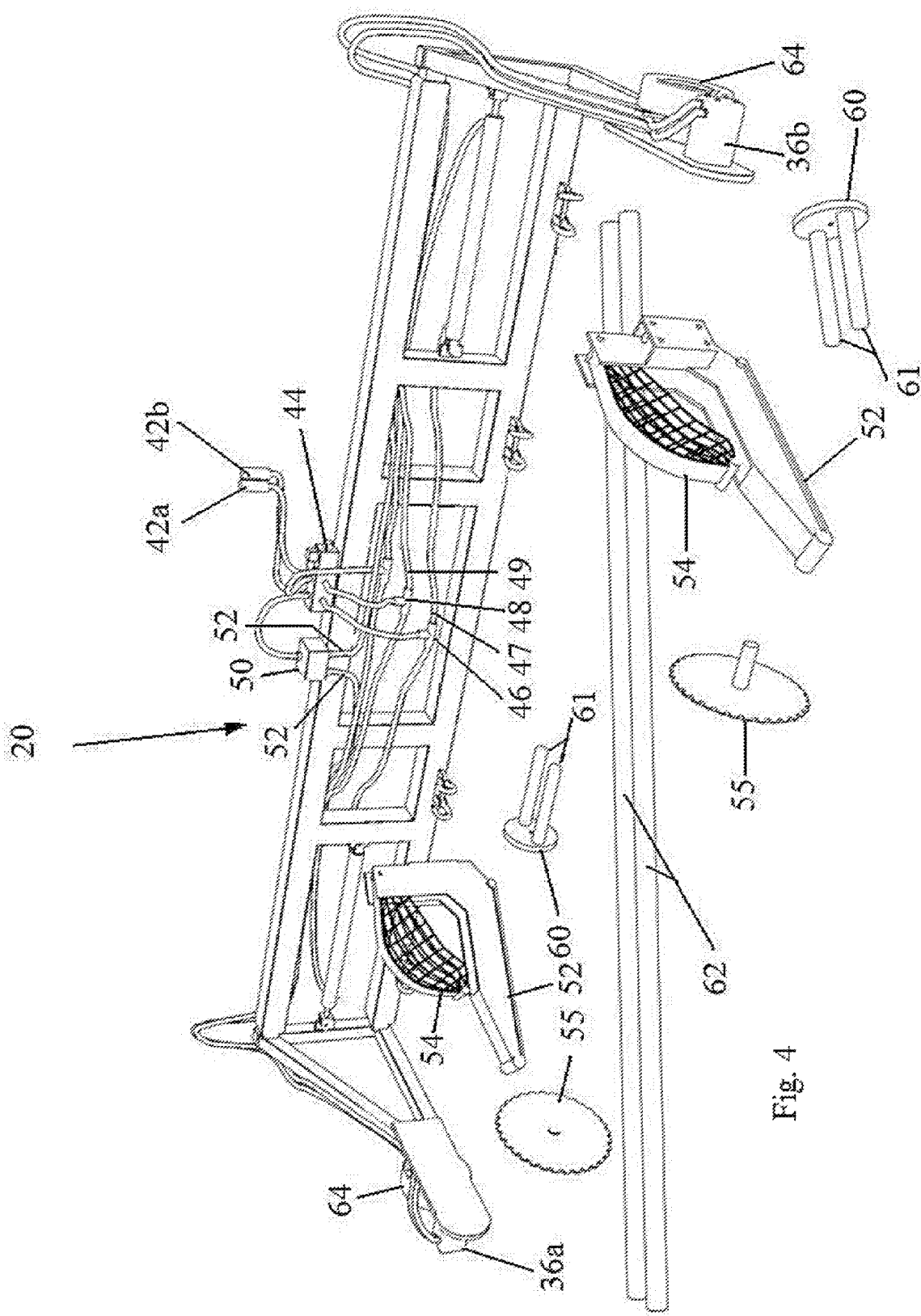
FIG. 4 is an exploded perspective view of the turf removal attachment of the present invention.

A first embodiment of the of the present invention is depicted in FIGS. 1 and 4 generally at 20. Turf removal attachment 20 includes a frame featuring a longitudinal spine 24 and two laterally extending arms 26a and 26b. Arms 26a and 26b are connected to spine 24 by means of slidable mounts 28a, 28b (FIG. 4) which telescope into the longitudinal ends 27a, 27b of spine 24, respectively. Hydraulic rams 30a, 30b move arms 26a, 26b in and out for the dual purposes of adjusting the width of the cut of the strip of turf 11 and to permit release of the turf roll 13 once a strip has been completely rolled. Mounting plate 32 is attached to the outside of spine 24 and allows the turf removal attachment 20 to be bolted to the front of a skid steer using the conventional attachment bolts associated therewith through holes 34.

Arms 26a and 26b have first and second motors 36a, 36b mounted thereon for powering turf removal tools which can be mounted thereon. Preferably, motors 36a, 36b are preferably hydraulic motors which receive hydraulic fluid from a source found on the skid steer (not shown). The hydraulic circuit 40 which makes this possible includes hydraulic quick couplers 42a, 42b which connect to the output and return lines from the hydraulic pump on the skid steer; electric over hydraulic valve assembly 44; first T-connector 46 for hydraulic lines 47 to extend hydraulic rams 30a, 30b and second T-connector 48 for hydraulic lines 49 to retract hydraulic rams 30a, 30b; hydraulic flow divider 50 to ensure equal flow through hydraulic lines 52 to power motors 36a, 36b.

Figure 2:
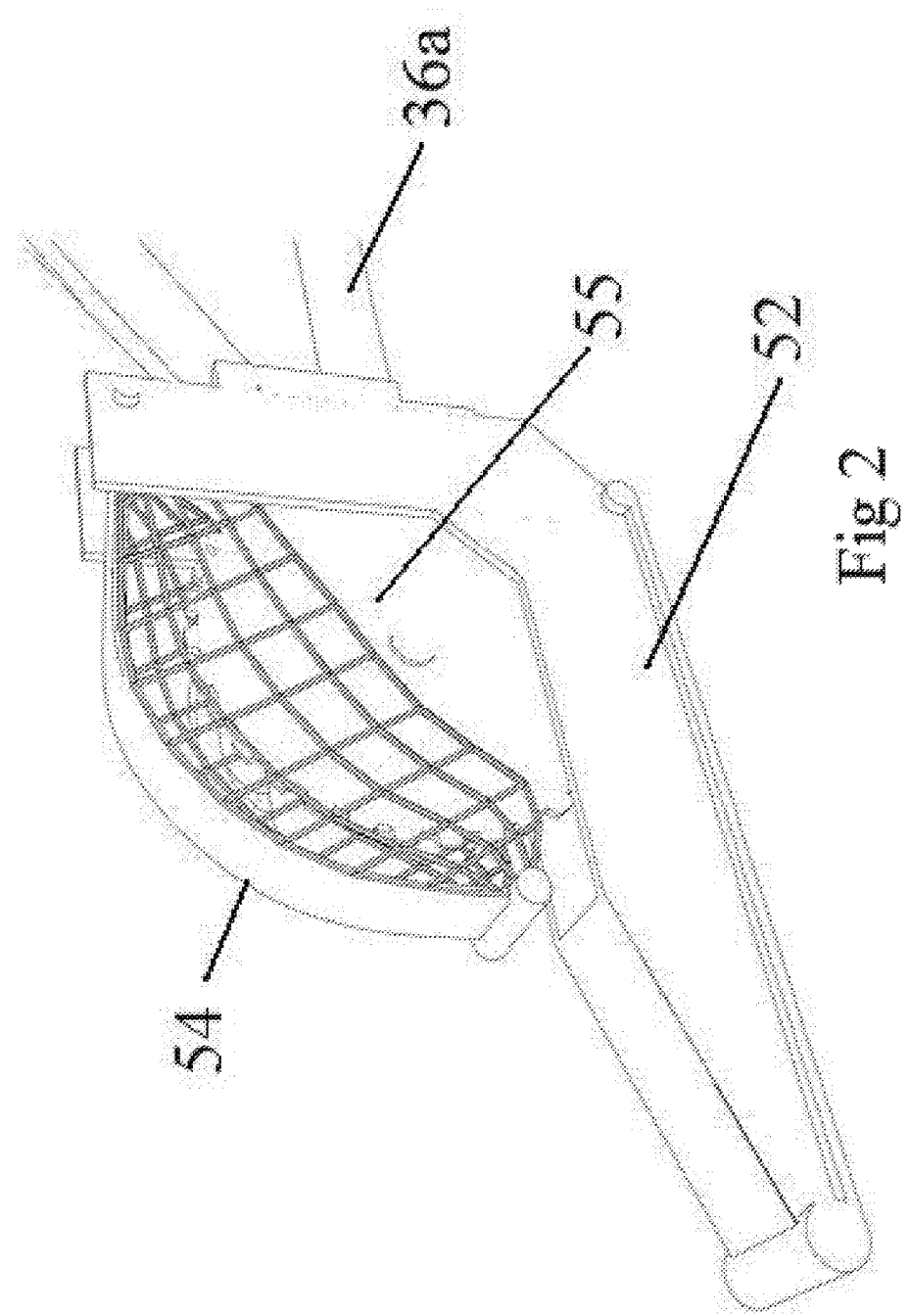
FIG. 2 is a front perspective view of a cutter shoe and blade guard of the present invention.
Figure 3:
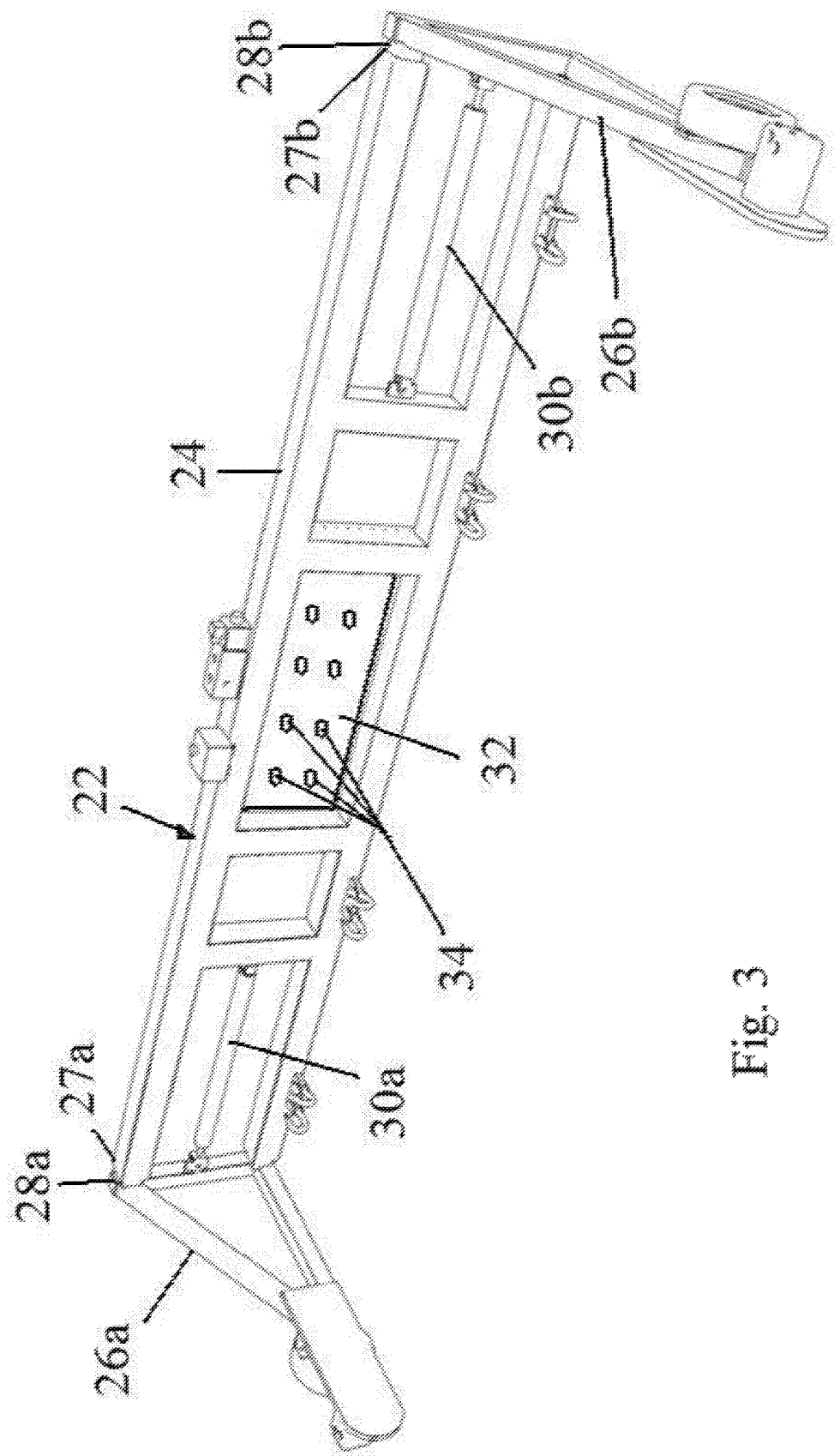
FIG. 3 is a front perspective view of the frame of first embodiment.

FIG. 2 depicts a cutter shoe 52 and blade guard 54 which surround turf cutting blade 55 and protect it (and personnel) against contact with foreign materials. Cutting blades 55 are connected to arms 26a, 26b in such a manner as to permit them to be powered by hydraulic motors 36a, 36b and shoes 52 attached to arms 26a, 26b so that they are just above or minimally contact the surface of turf 11.

Additional turf removal tools are depicted in FIG. 4 and include a pair of roller tines 60 which support roller pipes 62. Roller tines 60 can either have dual arms 61 as shown in FIG. 4 or can alternatively feature two sets of two, or four arms on each tine 60. In either case, tines are spaced in such a manner that roller pipes 62 (FIG. 1) grasp the lead end of turf 11 as roll formation is initiated and maintain a hold on the turf to avoid slippage ensuring a tight roll 13 is formed. Wheels 64 can be height adjusted to accommodate the particular features (thickness, etc.) of the synthetic turf field with which it is used. While the turf removal attachment 20 of the present invention may be made in whatever size desired, a preferred embodiment is capable of cutting turf 11 into strips having widths of 7.5 to 15 feet (2.5-5 yards).

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A synthetic turf removal attachment capable of being attached to a skid steer, comprising:
    (a.) a frame, comprising:
        (i.) a vertically oriented transverse component;
        (ii.) a first arm extending substantially orthogonally from a first distal end of the transverse component; and
        (iii.) a second arm extending substantially orthogonally from a second distal end of the transverse component, wherein the first distal end is on the opposite end of the transverse component from the second distal end;
    (b.) a first removable turf removal tool connected to a distal end of the first arm;
    (c.) a second removable turf removal tool connected to a distal end of the second arm;
    (d.) a first hydraulic motor operably coupled to the first turf removal tool;
    (e.) a second hydraulic motor operably coupled to the second turf removal tool;
    (f.) a hydraulic system, comprising:
        (i.) a first hydraulic quick coupler capable of being operably connected to an output port of an external source of hydraulic fluid and operably connected to a valve assembly;
        (ii.) a second hydraulic quick coupler capable of being operably connected to a return port of the external source of hydraulic fluid and operably connected to the valve assembly, wherein the external source of hydraulic fluid capable of being operably connected to by the first and second hydraulic quick couplers is a hydraulic system of the skid steer; and
        (iii.) the valve assembly operably connected to the first hydraulic motor and the second hydraulic motor; and
    (g.) a mounting plate attached to a rear face of the transverse component having a plurality of holes capable of accepting a plurality of attachment bolts, permitting attachment of the synthetic turf removal attachment to the skid steer.

2. The synthetic turf removal attachment of claim 1, further comprising:
    (a.) a first hydraulic ram located on the first arm and operably connected to the valve assembly wherein the first hydraulic ram is parallel to and connected to the vertically oriented transverse component and is perpendicular to and connected to the first arm, further wherein the first hydraulic ram is adapted to move the first arm laterally; and
    (b.) a second hydraulic ram located on the second arm and operably connected to the valve assembly wherein the second hydraulic ram is parallel to and connected to the vertically oriented transverse component and is perpendicular to and connected to the second arm, further wherein the second hydraulic ram is adapted to move the second arm laterally.

3. The synthetic turf removal attachment of claim 1, wherein the first and second removable turf removal tools are turf cutting tools.

4. The synthetic turf removal attachment of claim 3, wherein the first and second removable turf cutting tools each comprise:
    (a.) a turf cutting blade;
    (b.) a cutter shoe; and
    (c.) a retractable blade guard, wherein the retractable blade guard covers the turf cutting blade when not in use.

5. The synthetic turf removal attachment of claim 1, wherein the valve assembly is an electric over hydraulic valve assembly.

6. The synthetic turf removal attachment of claim 1, wherein the first arm, the second arm, and the transverse component form a C-shape.

7. The synthetic turf removal attachment of claim 1, wherein the first hydraulic motor is located on the first arm.

8. The synthetic turf removal attachment of claim 1, wherein the second hydraulic motor is located on the second arm.

9. The synthetic turf removal attachment of claim 1, wherein the hydraulic system is mounted on the transverse element.

10. The synthetic turf removal attachment of claim 1, wherein the hydraulic system further comprises a splitter valve capable of ensuring that equal hydraulic force is applied to each of the first and second hydraulic motors.

11. The synthetic turf removal attachment of claim 1, wherein the first and second turf removal tools are turf rolling tools.

12. The synthetic turf removal attachment of claim 11, wherein each turf rolling tool comprises a pair of roller tines.

13. The synthetic turf removal attachment of claim 1, further comprising a first height-adjustable wheel rotatably mounted to the first arm and a second height-adjustable wheel rotatably mounted to the second arm.

* * * * *